United States Patent [19]

Franey et al.

[11] Patent Number: 5,154,886
[45] Date of Patent: Oct. 13, 1992

[54] PROTECTION OF DEVICES

[75] Inventors: John P. Franey, Bridgewater; Thomas E. Graedel, Mendham, both of N.J.

[73] Assignee: AT&T Bell Laboratories, Murray Hill, N.J.

[21] Appl. No.: 558,990

[22] Filed: Jul. 27, 1990

Related U.S. Application Data

[63] Continuation-in-part of Ser. No. 399,427, Aug. 23, 1989, which is a continuation of Ser. No. 105,946, Oct. 8, 1987, abandoned.

[51] Int. Cl.⁵ .............................................. C23F 11/00
[52] U.S. Cl. .......................................... 422/8; 422/7; 428/922
[58] Field of Search ..................... 422/7, 8, 9; 428/922

[56] References Cited

U.S. PATENT DOCUMENTS

| | | | |
|---|---|---|---|
| 4,027,659 | 6/1977 | Slingluff | 428/922 |
| 4,154,344 | 5/1979 | Yenni, Jr. et al. | 428/922 |
| 4,156,751 | 5/1979 | Yenni, Jr. et al. | 428/922 |
| 4,424,900 | 1/1984 | Petcavich | 428/922 |
| 4,471,872 | 9/1984 | Dedow | 428/922 |
| 4,542,054 | 9/1985 | Fillmann | 428/922 |
| 4,648,508 | 3/1987 | Neal et al. | 428/922 |
| 4,664,971 | 5/1987 | Soens | 428/922 |
| 4,746,574 | 5/1988 | Hattori et al. | 428/922 |
| 4,944,916 | 7/1990 | Franey | 422/8 |

FOREIGN PATENT DOCUMENTS 1076362   4/1986   Japan ................................... 428/922

OTHER PUBLICATIONS

F. Carmona, *Physica A*, 157, 461 (1989).

Primary Examiner—Robert J. Warden
Assistant Examiner—Krisanne M. Thornton
Attorney, Agent, or Firm—B. S. Schneider

[57] ABSTRACT

By using a specific polymer material for handling, shipping, and storage, integrated circuits are protected from both corrosion and electrostatic discharge. This enclosure material includes a polymer matrix with both carbon black and a metal embedded. Suitable metals include copper, iron, cobalt, and manganese.

8 Claims, 2 Drawing Sheets

PROTECTION OF DEVICES

CROSS REFERENCE TO RELATED APPLICATIONS

This application is a continuation-in-part of co-pending Ser. No. 07/399,427, dated Aug. 23, 1989, which is a continuation of U.S. application Ser. No. 07/105,946 dated Oct. 8, 1987, (now abandoned) both of which are hereby incorporated by reference.

BACKGROUND OF THE INVENTION

1. Field of the Invention

This invention relates to protection of integrated circuits and, in particular, to the corrosion and electrostatic discharge protection of integrated circuits.

2. Art Background

Integrated circuits and their assemblages are typically handled, shipped, and stored in packaging material such as rigid containers, plastic bubble holders sealed with a plastic tape (denominated "tape and reel carriers") plastic bags, and polymer foam. For a wide variety of integrated circuits, electrostatic charge/discharge and possibly corrosion protection must be provided to avoid destruction or serious degradation of the integrated circuit during storage, shipping, or use. For example, static electricity discharge from a person to a device being handled (an occurrence common during the winter season) is often sufficient to produce such damage. Additionally, for devices having exposed readily-corrodible metallization, gases in the air including hydrogen chloride, chlorine and hydrogen sulfide cause degradation, especially when in the presence of water vapor.

Various means have been attempted to provide electrostatic or corrosion protection. In the case of corrosion protection, generally a material containing a volatile organic material is placed in the same shipping container as the integrated circuit. These volatile organic materials such as fatty acids coat the leads of the integrated circuits and provide some corrosion protection. However, the organic material, because of its volatility, is transient; hence, meaningful protection over a substantial period of time is often lacking. Additionally, the organic material contaminates exposed metal and thus hinders subsequent soldering.

A typical approach for providing electrostatic protection involves the surface metallization of a plastic packing material such as a polyethylene bag with, for example, aluminum. Although this approach yields some electrostatic protection, it is expensive and typically protection is limited because static charge is dissipated too rapidly and the potential for arcing to the device enhanced. Volatile organic coatings are also employed for electrostatic protection but induce time dependent variations in surface resistance of the device and have the same shortcomings as result from their use for corrosion protection. Use of an organic polymer is configurations such as polymer bags impregnated with carbon is yet another approach to discharge protection. However, the conductivity of such materials is disadvantageously high for static dissipative purposes [less than $10^{+4}$ ohms/square] and this conductivity is such a highly nonlinear function of carbon black concentration that a desired conductivity is difficult to achieve reproducibly by conventional manufacturing techniques. Further, the carbon black sheds from the polymer and makes such materials unacceptable for most clean room environments. Thus, the protection of many integrated circuits is less than entirely desirable.

SUMMARY OF THE INVENTION

The use of a specific polymer guard for electrostatic sensitive portions of an integrated circuit device yields excellent protection and in specific embodiments also yields corrosion inhibition. In particular, a polymer matrix, e.g., polyethylene, is formed into a configuration such as a bag, a rigid container, or a tape and reel carrier. This polymer matrix is formulated to include impregnated particles of carbon black and of a metal that undergoes chemical bonding with the carbon and in preferred embodiments also with the polymer. Carbon black is defined as a finely divided form of carbon such as that obtained by the incomplete combustion of natural gas. For electrostatic protection, exemplary carbon blacks have high specific surface areas (preferably at least 750 $m^2/g$, measured by the $N_2$ BET method) and large pore volume (preferably at least 200 ml/100 g). Exemplary of suitable metals are copper, iron, cobalt, manganese, and alloys of these metals.

Thus, in one embodiment integrated circuits are shipped in a polymer bag where the polymer material has embedded particles of carbon black and copper metal. Typical loading percentages of the carbon black and metal are respectively 1 to 6 and 10 to 30 weight percent. The use of carbon black with, for example, copper or iron in addition to an electrostatic charge protection provides a barrier to water vapor. Also, it affords corrosion protection from hydrogen sulfide, chlorine, hydrogen chloride, and other corrosive gases. Preferred materials also produce essentially no shedding of particles as shown by extensive laboratory tests.

DETAILED DESCRIPTION

The integrated circuit should be protected from any source of discharge or charge accumulation by the loaded polymeric material involved in the invention. Generally this protection involves the positioning of the polymer material between the integrated circuit and the source of or sink for electrostatic charge, such as a human being. For example, the integrated circuit is inserted into a bag formed from a suitable loaded polymer. Alternatively, in the case of an electronic device such as a computer, the case of the device is coated with the impregnated polymer material to protect the integrated circuits contained internally. The exact form and positioning of the polymer is not critical provided it interdicts any electrical discharge to or from the device.

The particular polymer chosen as the matrix is not critical. Typically, polymers such as polyethylene and polypropylene are useful. Generally the polymer is chosen so that the required loading with carbon black and metal does not substantially degrade the polymer film. (Substantial degradation in the context of this invention is loss of mechanical coherency.)

Figure 1:
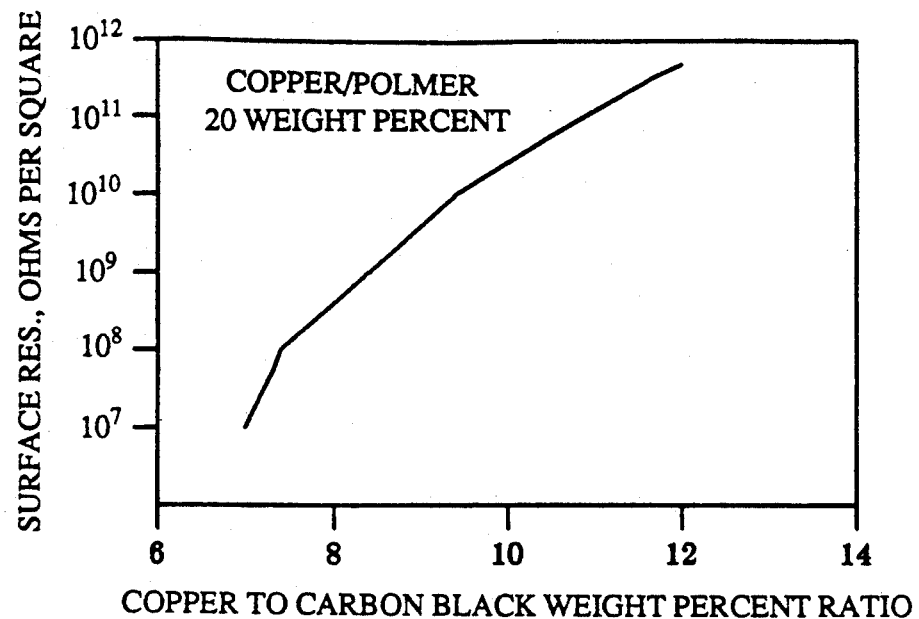
FIG. 1 is a graph of the copper to carbon black weight percent ratio vs. the surface resistivity.
Figure 2:
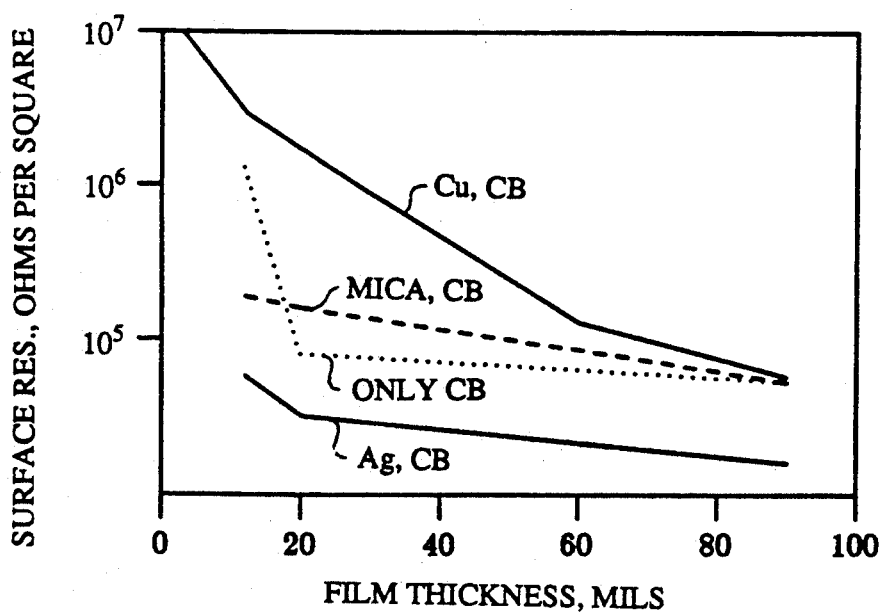
FIG. 2 is a graph of the film thickness vs. the surface resistivity.

As previously discussed, the polymer is loaded with a combination of carbon black and a metal. The combination is chosen to yield a resulting resistivity of the polymer/carbon black/metal combination in the range $1 \times 10^{+6}$ to $1 \times 10^{+12}$ ohms/square. Resistivities greater than $1 \times 10^{+12}$ ohms/square are not desirable since they induce excess charge storage and the resulting potential for discharge damage, while resistivities less than $1 \times 10^{+6}$ ohms/square are also not desirable since conduction through the polymer to the integrated circuit is great enough generally to cause damage. The use of a combination of a suitable metal and carbon black not only produces resistivity in the desired range, but additionally yields selectable resistivities by varying the compositional range. For example, a combination of copper and carbon black as shown in FIG. 1 yields suitable resistances in the copper to carbon black weight ratio range of 7 to 11 for carbon black/polymer weight percent loading of 1 to 5. Thus, fabrication parameters are not critical and a protection material having suitable resistivity is much more easily manufactured. In contrast, a combination of silver with graphite, graphite alone, or a combination of mica and graphite as shown in FIG. 2 yields resistivities outside the desired range and also produces in many instances a strong nonlinear dependence of resistivity on loading amount.

Although the exact reason for this phenomenon is not entirely explicated, an appropriate explanation involves the interaction of the metal with the carbon black and the polymer. A system does not have an appropriate conductivity until the loading material is in sufficient concentration that paths of conducting material are built up. (The term "path" used here does not imply physical contact between adjacent carbon black particles, since it has been established that, for carbon black, conduction by electron tunneling establishes conductivity well before the loading at which physical contact occurs.) In the case of carbon black loading, once these paths are produced, resistivity rapidly decreases with small additions. That is, once paths are established, a number of conducting paths of varying efficiencies connect each surface point with other surface points. Additional carbon black loading produces no significant additional conducting path between surface points. Loading only with metal such as copper yields high resistivity, since the native oxides of these metals are poorly conducting.

The use of both carbon black and an additional material such as a metal presents two possibilities. If the material does not bond to the carbon, as with mica, it will distribute itself randomly in spatial relation to the carbon black conductive paths. The degree to which the conductivity of the carbon black paths are decreased by the higher resistivity material (either a nonconducting material or a semiconducting surface oxide) depends on the amount of material that happens to interrupt the conducting paths. The choice of a material that bonds to the carbon black ensures its presence in the carbon black path and ensures predictable resistivity decrease into the desired resistivity range. In addition, the choice of metals that react with the polymer, such as a transition metal that can undergo one-electron transfer between two states of similar stability, serves to bond both the carbon and the metal to the polymer and essentially eliminate flaking.

The exact resistance obtained using carbon black and a metal is easily controlled by adjusting the amount of metal to carbon black present. That is, since the metal with its associated surface oxide chemcially bonds to the carbon, the metal is always in the conducting path and a given percentage of metal to graphite will reproducibly yield the same resistivity each time. In contrast, metals that do not bond with the carbon black may or may not be in the conducting path and thus the same composition will not reliably yield the same resistivity.

Figure 3:
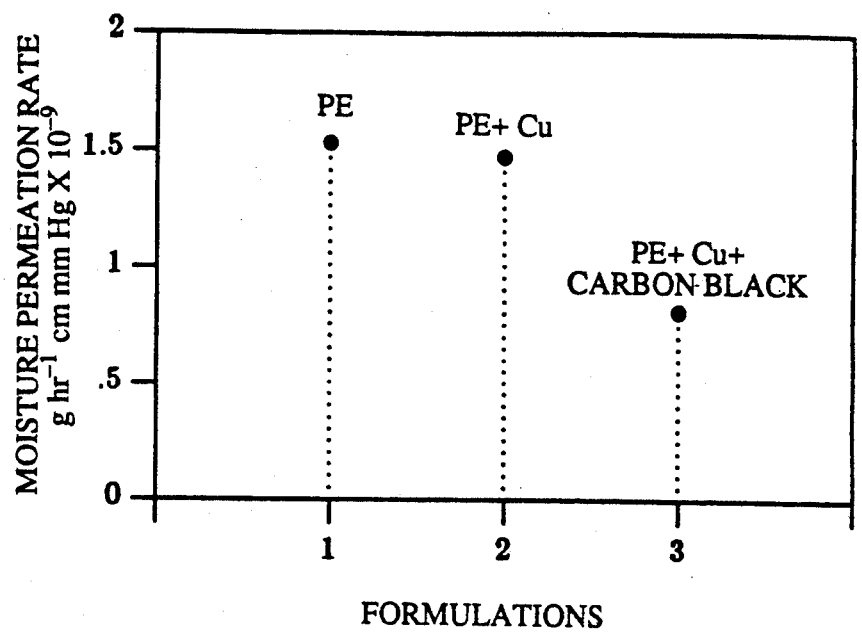
FIG. 3 is a graph of the moisture permeation rate of various formulations.

Generally, for highly conducting carbon blacks (e.g., Ketjen black) loading percentages in the range 1 to 5 with metal loading percentages in the range 10 to 40 are employed. (Loading percentage is weight percent of additive relative to the polymer weight in the absence of additive. For less conductive carbon black, higher loading of carbon black should be used.) The exact percentages depend on the particular carbon black and metal used. A controlled sample is easily employed to determine an appropriate composition ratio for a given metal and carbon black material. Various carbon black materials are available. However, highly oxidized, highly porous carbon blacks are advantageous because of their high and reproducible conductivity. Metals that bond to the carbon including copper, cobalt, manganese, iron and their alloys are useful. Iron and copper also yield corrosion resistance to gases such as hydrogen sulfide, chlorine, and hydrogen chloride. Corrosion is further inhibited by the ability of the material to serve effectively as a barrier to water vapor as shown in FIG. 3.

The carbon black and the metal material should be introduced into the polymer matrix in the form of particles through conventional techniques such as low temperature mechanical mixing and extrusion. Formation of the protecting configuration is also accomplished by conventional techniques such as film blowing and vacuum forming. It is possible to introduce additional additives such as molding and stabilizing constituents to adjust material properties such as mold release characteristics and oxidative degradation rate.

The following examples are illustrative of the invention.

EXAMPLE 1

Pelletized polyethylene (having a small amount of mold release and stabilizer additives) was placed in the main hopper of a twin screw extruder with the mill screws pitched to work the polymer as little as possible. Ketjen Black EC (KBEC) a highly conductive, highly oxidized form of carbon black with substantial porosity as described by F. Carmona, *Physica A*, 157,461 (1989) was mixed with flaked copper having flakes in the size range of 0.3 to 7 µm. (The carbon black constituted 2.5 weight % of the copper/carbon black mixture. The extruder was run to produce approximately 5 mm diameter rods which were cooled and cut at 10 mm intervals to produce pellets. The pellets were used in turn to produce blown bags. Typical single screw extruders with film blowing equipment were employed with a blow up ratio (the ratio of die head diameter to flat tube diameter) in the 3 to 6 range. Bags were formed from the blown film on standard cutting and heat sealing machines. The bags had a wall thickness of approximately 3 mils.

Figure 4:
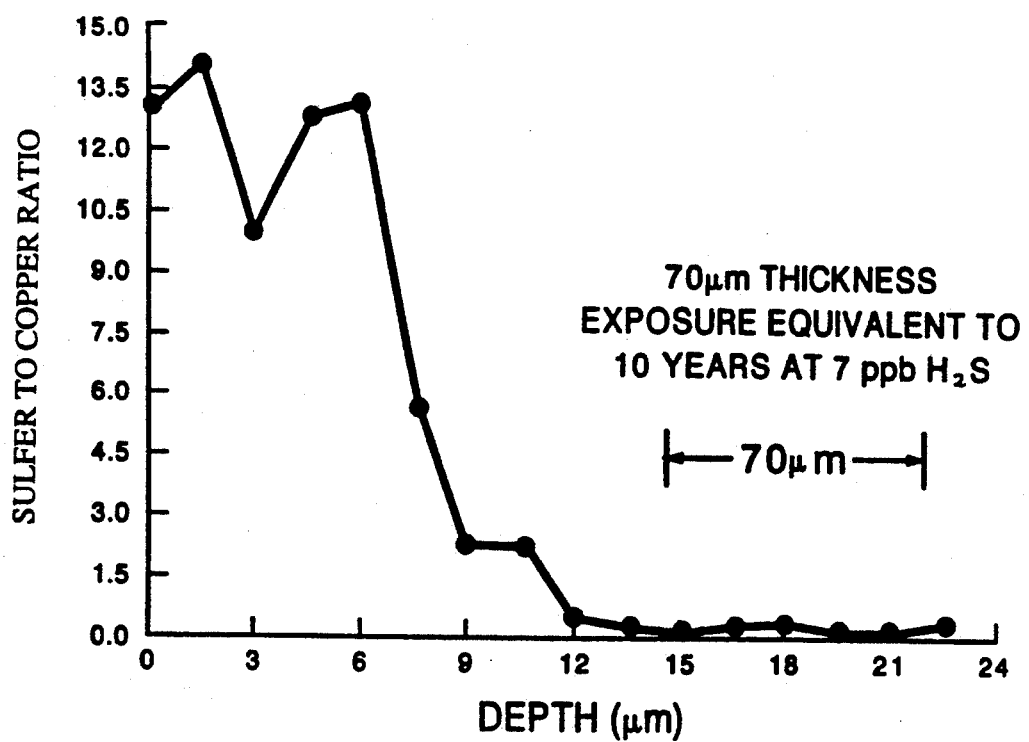
FIG. 4 is a graph of the depth vs. the sulfur to copper ratio.

A similar procedure was employed to form bags from polyethylene without the presence of carbon black and copper and from polyethylene including just the copper. The moisture permeation rate through each of these bags is shown in FIG. 3. The bags having both carbon black and copper, demonstrated volume resistivities in the range $5 \times 10^4$ ohms/sq. to $2 \times 10^8$ ohms/sq. Additionally, samples of the bag film were exposed to pure hydrogen sulfide and the hydrogen sulfide molecular permeation was determined by sampling zero air passed across the inner surface of the film. In addition, the film was sectioned following the exposure and the sulfur concentration within the film at various depths were determined as shown in FIG. 4. Samples of the bags were also placed in a Helmke drum tester and tumbled for 5 minutes. After such tumbling the number of shed particles was measured. The results of the particle measurements are shown in Table I.

TABLE I

ANTI-STATIC MATERIAL EVALUATION TUMBLE TEST RESULTS

| MINUTE | PARTICLES GREATER THAN OR EQUAL TO | | | | |
|---|---|---|---|---|---|
| | .2 μm | .3 μm | .5 μm | 1.0 μm | 5.0 μm |
| 1 | 334 | 275 | 159 | 74 | 25 |
| 2 | 336 | 271 | 171 | 93 | 26 |
| 3 | 386 | 331 | 213 | 116 | 34 |
| 4 | 201 | 161 | 106 | 58 | 13 |
| 5 | 154 | 133 | 93 | 42 | 12 |
| AVERAGE PER MINUTE | 282.2 | 234.2 | 148.4 | 76.6 | 22 |
| AVERAGE PER SQ. INCH MATERIAL | 3.01 | 2.49 | 1.58 | 0.82 | 0.23 |

The particles observed are less than that shed by class 10 approved clean room gloves.

EXAMPLE 2

Molded sheets of polyethylene having various constituents were formed by mixing these flake constituents with polyethylene pellets in a Brabender mixer. The resulting mixture was processed in a heated rolling mill and molded sheets were produced by sequential passage through a steam press. The characteristic of the flakes employed is shown in Table 2.

TABLE 2

CHARACTERISTICS OF FLAKE CONSTITUENTS

| Material | Flake Dimensions (μm) | Apparent Density (g cm$^{-3}$) | Surface Area (m$^2$g$^{-1}$) | Resistivity (Ω/square) |
|---|---|---|---|---|
| KBEC | 4 × 15 × 0.5 | 0.15 | 800 | 1375 |
| Copper | 3 × 7 × 0.5 | 0.72 | 1.1 | 1.7 |
| Silver | 0.3 × 1 × 0.5 (est) | 2.6 | 0.45 | 1.6 |
| Mica | 4 × 10 × 0.5 | 0.21 | 5.1 | >10$^4$ | and the composition of these flakes in the polyethylene is shown in Table 3

TABLE 3

ALTERNATIVE FLAKE/POLYMER FORMULATIONS

| Formulation | Fractional percent | | | | |
|---|---|---|---|---|---|
| | Resin | KBEC | Cu | Ag | Mica |
| Weight percent: | | | | | |
| 1 | 96 | 4 | 0 | 0 | 0 |
| 2 | 75 | 5 | 20 | 0 | 0 |
| 3 | 74 | 4 | 0 | 22 | 0 |
| 4 | 89 | 4 | 0 | 0 | 7 |
| Volume percent: | | | | | |
| 1 | 98 | 2 | 0 | 0 | 0 |
| 2 | 95 | 2 | 3 | 0 | 0 |
| 3 | 95 | 2 | 0 | 2 | 0 |
| 4 | 95 | 2 | 0 | 0 | 3 |

FIG. 2 shows the surface resistance vs. sheet thickness for these loaded polymers.

We claim:

1. A process of protecting a device from electrostatic discharge, said process comprising the steps of positioning said device with respect to a protecting body, said body comprising a polymer film having embedded particles wherein said particles include particles comprising carbon black and particles comprising a metal material that binds to said carbon in an amount sufficient to protect a device from electrostatic discharge, whereby static discharge to or from said device is limited.

2. The process of claim 1 wherein said metal binds to said polymer.

3. The process of claim 1 wherein said device comprises an integrated circuit.

4. The process of claim 1 wherein said metal also protects said device from corrosion.

5. The process of claim 4 wherein said metal is chosen from the group consisting of iron and copper.

6. The process of claim 1 wherein said metal is chosen from the group consisting of iron, cobalt, manganese and copper.

7. The process of claim 6 wherein such polymer comprises polyethylene.

8. The process of claim 1 wherein said protection means has a resistivity in the range $1 \times 10^6$ to $1 \times 10^{12}$ ohms/square.

* * * * *